UNITED STATES PATENT OFFICE 2,260,376

METHOD OF PREPARING β(o-METHYL PHENOXY) β'THIOCYAN ETHYL ETHER

Oscar F. Hedenburg, Pittsburgh, Pa., assignor to Rex Research Corporation, Toledo, Ohio, a corporation of Delaware No Drawing. Application June 27, 1938, Serial No. 216,069

2 Claims. (Cl. 260—454)

This invention consists in a method of preparing a certain composition of matter which I have discovered to possess insecticidal properties superior to those of similar compounds heretofore produced.

My improved compound may be characterized as an aromatic alkyl thiocyanate, in which the thiocyan group is attached to the alkyl group. Similar compounds previously proposed include aromatic isothiocyanates in which the isothiocyanate group is attached to the aromatic group; and aliphatic thiocyanates. The compound of my invention consists of an aromatic aliphatic thiocyanate in which, with respect to the aliphatic chain, the thiocyan group and an aromatic group occupy interchangeably the β and β' positions. Typically the compound of my invention is β (o-methyl phenoxy) β' thiocyan ethyl ether, responsive to the formula

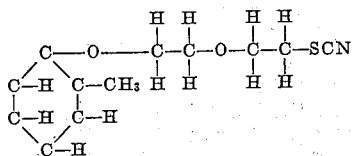

The phenolic group of the foregoing formula is, specifically, cresylic; any other phenolic group may be present in substitution for the cresylic. This phenolic group of the formula given is of the ortho type; it may, alternatively, be of meta or of para type. The aliphatic group of the formula given above is, specifically, that of the methyl compounds; any other aliphatic group may be present in substitution for the methyl group. And there may be more than one aliphatic group attached to the aromatic group. Other groups may replace hydrogen in the aromatic group, such as chlorine.

The compound of my invention may typically be prepared as follows:

810 grams of ortho cresol, $CH_3C_6H_4OH$, 1287 grams of ββ'dichlorethyl ether, $C_4H_8OCl_2$, and 50 grams of water are heated to about 106° C., with agitation. To this 300 grams of sodium hydroxide (100%) in 50% aqueous solution are slowly added in ten portions.

In an actual performance, the total time of heating and agitation was a little more than fourteen hours. The period of the sodium hydroxide addition was five hours and thirty-four minutes. Each portion of the solution was added in the course of an interval of average duration of thirty-three minutes. When the full quantity (300 grams) of sodium hydroxide solution had thus been added, an excess quantity of ten percent (30 grams) of the same sodium hydroxide solution was added; and thereafter the heating was continued for three hours.

The essential reaction is according to the equation—

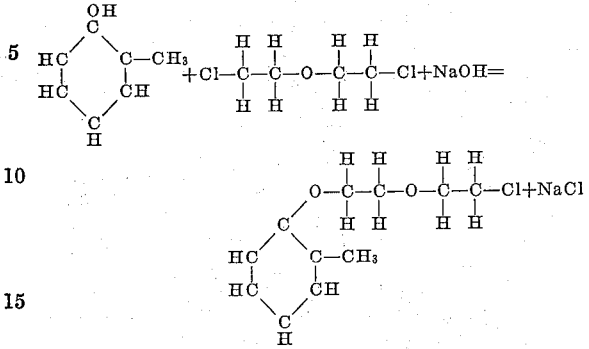

In the actual performance described above a crude product of 1745 grams was obtained. This under distillation yielded β(o-methyl phenoxy) β'chlorethyl ether, 97.5% pure, 1151.5 grams (=1122.7 grams C. P.)

|   | Grams |
|---|---|
| Unused dichlorethyl ether | 389.5 |
| Intermediate boiling substance | 25 |
| Dark residue | 164.5 |

The 1122.7 grams of pure o-cresoxy chlorethyl ether—β(o-methyl phenoxy) β'chlorethyl ether—was a 70% yield, on the basis of the ortho cresol used, but a 77.4% yield, on the basis of the ortho cresol actually entering into reaction. Eighty grams of unreacted ortho cresol were recovered from the aqueous solution that was separated from the 1745 grams of crude product, first mentioned above. This recovered material would, in commercial operation, be available for repeated use. Otherwise, the loss of material due to unintended reaction is small.

The o-cresoxy chlorethyl ether obtained in the manner indicated is then reacted with sodium thiocyanate, according to the following equation—

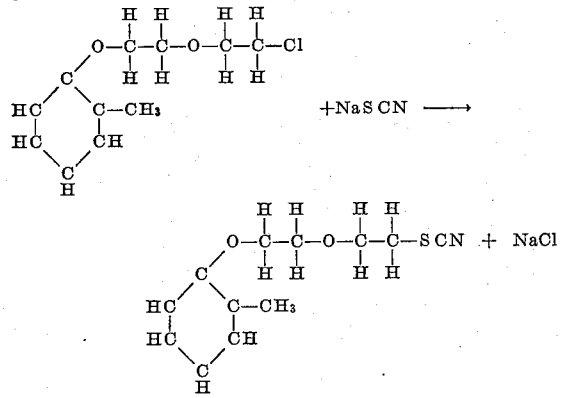

In actual performance 440 grams (97.5% pure) of β(o-methyl phenoxy)β'chlorethyl ether, 178.2 grams of thiocyanate, NaSCN (2 mols+ 10%), and .88 gram diethyl amine (1.36 c. c.) were heated together, with agitation, for about 72 hours, at a temperature ranging near 130° C. Benzol then was added and the flask was shaken. The contents of the flask were filtered and washed with benzol. The benzol then was distilled off, and 487 grams of a brown product were obtained. This product was β(o-methyl phenoxy) β'thiocyan ethyl ether of about 95% purity.

The use of benzol is not essential. It suffices to add water (to dissolve the soft formed) and to be separated by decantation of the supernatant layer of the desired product. The formation of an emulsion may occur and then may be broken by percolation through salt (NaCl). Herein is found the subject matter of a companion application for Letters Patent.

In the performance last described the diethyl amine serves as a catalyst. Other substances that may serve alternatively as catalysts in this association are morpholine and other secondary amines.

This substance, β(o-ethyl phenoxy) β'thiocyan ethyl ether, I have found to be superior as an insecticide to the substances of like general character that have been specified above. It is less objectionable in odor than any of them, and while less toxic to animals (particularly when applied to the skin) it is more toxic to insects. When used as a spray it will bring down flies, for example, in equal numbers, and will be found to be more effective in the killing of the flies brought down.

As I have already explained, in place of ortho cresol,

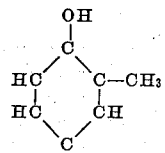

meta cresol,

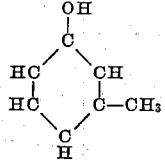

or para cresol,

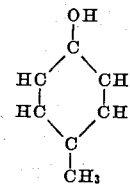

may be employed, with corresponding variation in the ultimate product; and, in place of cresol, specifically, any phenol may be employed.

Also, in place of dichlorethyl ether

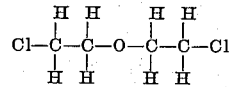

the dichloride of another aliphatic ether may be employed as, for example, dichlormethyl ether,

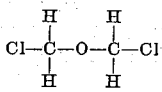

Theoretically, these substitutions of aliphatic dichlorides may be made without limit; practically, operation will be limited to those that under reasonable conditions of heat and pressure may be maintained in liquid condition during reaction.

As already I have said, a plurality of these aliphatic dichlorides may enter into the reaction.

I claim as my invention:

1. The method herein described of preparing β(o-methyl phenoxy) β'thiocyan ethyl ether which consists in reacting β(o-methyl phenoxy) β'chlorethyl ether with a thiocyanate in the presence of a secondary amine.

2. The method herein described of preparing a βphenoxy β'thiocyan ethyl ether in which a hydrogen of the phenyl group is substituted by the methyl group which consists in reacting β-phenoxy β'chlorethyl ether in which a hydrogen of the phenyl group is substituted by the methyl group with a thiocyanate in the presence of a secondary amine.

OSCAR F. HEDENBURG.